US012581365B2

(12) United States Patent
Pai et al.

(10) Patent No.: US 12,581,365 B2
(45) Date of Patent: Mar. 17, 2026

(54) NETWORK LOAD BALANCING BASED ON DEVICE TYPE OR HISTORY

(71) Applicant: T-Mobile USA, Inc., Bellevue, WA (US)

(72) Inventors: Amembal Vikram Pai, Bothell, WA (US); Roopesh Kumar Polaganga, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 87 days.

(21) Appl. No.: 18/443,257

(22) Filed: Feb. 15, 2024

(65) Prior Publication Data

US 2025/0267515 A1 Aug. 21, 2025

(51) Int. Cl.
| | |
|---|---|
| *G06F 15/173* | (2006.01) |
| *H04W 28/02* | (2009.01) |
| *H04W 28/08* | (2023.01) |

(52) U.S. Cl.
CPC ... *H04W 28/0983* (2020.05); *H04W 28/0215* (2013.01)

(58) Field of Classification Search
CPC ..................... H04W 28/0983; H04W 28/0215
See application file for complete search history.

(56) References Cited

U.S. PATENT DOCUMENTS

| | | | |
|---|---|---|---|
| 2012/0207121 A1* | 8/2012 | Dalsgaard | ............. H04W 48/16 |
| | | | 370/329 |
| 2022/0124574 A1* | 4/2022 | Veggalam | ............. H04W 24/02 |

* cited by examiner

*Primary Examiner* — Joseph R Maniwang
(74) *Attorney, Agent, or Firm* — Foley IP Law, PLLC

(57) ABSTRACT

Solutions are disclosed that perform network load balancing based on device type and/or history. Current "fair" criteria, such as round-robin selection, that select user equipment (UEs) for off-loading to lower-bandwidth frequency layers do not take into account bandwidth usage history and device type, even though human users using enhanced Mobile Broadband (eMBB) devices are typically more delay-sensitive than fixed wireless access (FWA) UEs, even while an FWA may consume as much network bandwidth as 10 eMBBs. Example solutions determine UE device type and/or bandwidth usage history, and prioritize certain UEs (e.g., eMBB) for higher-bandwidth frequency layers than other UE types (e.g., FWA) and/or UEs that have a history of heavy bandwidth use. This enhances the user experience for a larger number of delay-sensitive users.

20 Claims, 14 Drawing Sheets

FIG. 3

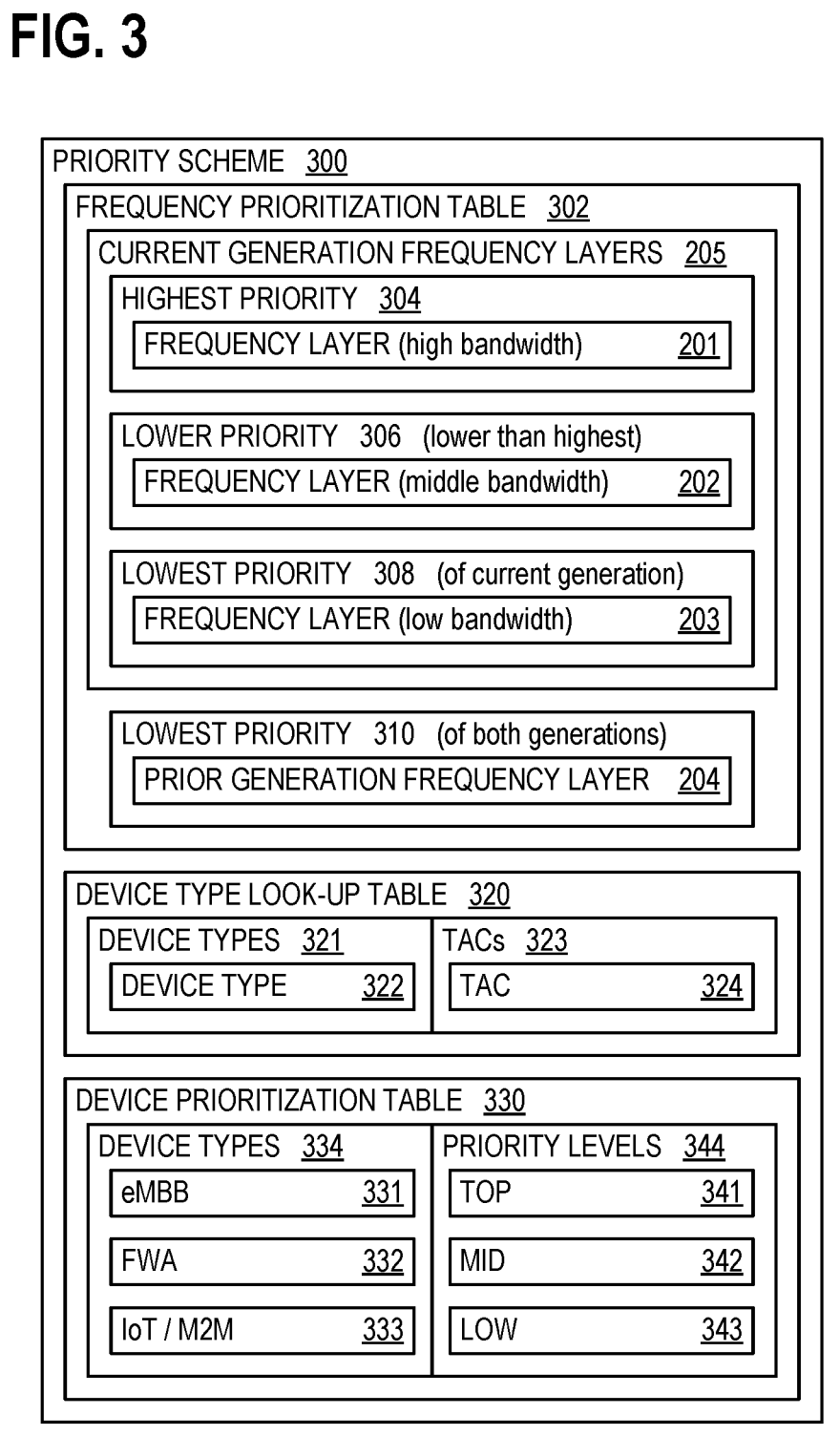

PRIORITY SCHEME   300

FREQUENCY PRIORITIZATION TABLE   302

CURRENT GENERATION FREQUENCY LAYERS   205

HIGHEST PRIORITY   304

FREQUENCY LAYER (high bandwidth)     201

LOWER PRIORITY   306   (lower than highest)

FREQUENCY LAYER (middle bandwidth)     202

LOWEST PRIORITY   308   (of current generation)

FREQUENCY LAYER (low bandwidth)     203

LOWEST PRIORITY   310   (of both generations)

PRIOR GENERATION FREQUENCY LAYER     204

DEVICE TYPE LOOK-UP TABLE   320

| DEVICE TYPES   321 | TACs   323 |
|---|---|
| DEVICE TYPE    322 | TAC    324 |

DEVICE PRIORITIZATION TABLE   330

| DEVICE TYPES   334 | PRIORITY LEVELS   344 |
|---|---|
| eMBB    331 | TOP    341 |
| FWA    332 | MID    342 |
| IoT / M2M    333 | LOW    343 |

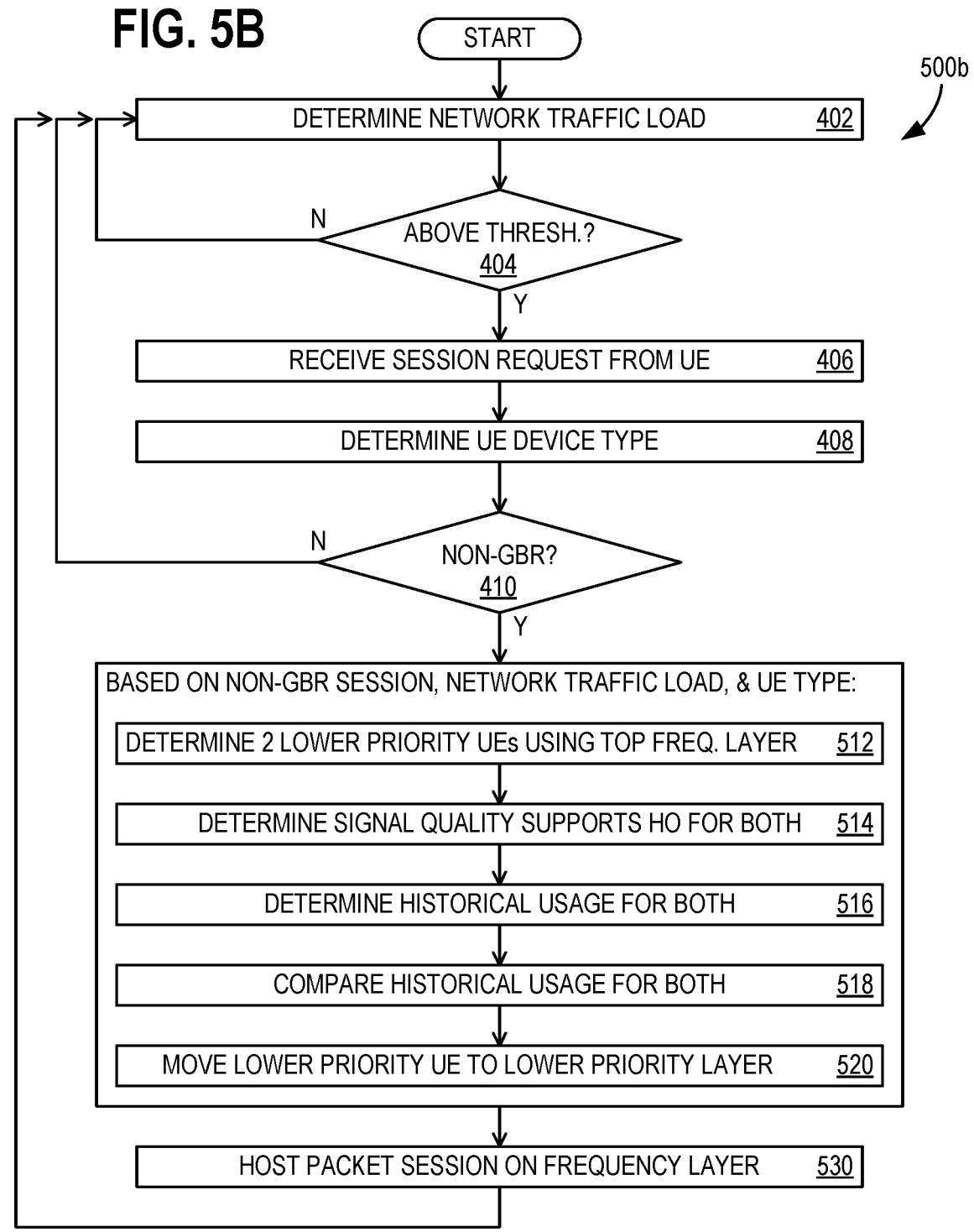

START

500b

DETERMINE NETWORK TRAFFIC LOAD        402

ABOVE THRESH.?        404        N

RECEIVE SESSION REQUEST FROM UE        406        Y

DETERMINE UE DEVICE TYPE        408

NON-GBR?        410        N

BASED ON NON-GBR SESSION, NETWORK TRAFFIC LOAD, & UE TYPE:        Y

DETERMINE 2 LOWER PRIORITY UEs USING TOP FREQ. LAYER        512

DETERMINE SIGNAL QUALITY SUPPORTS HO FOR BOTH        514

DETERMINE HISTORICAL USAGE FOR BOTH        516

COMPARE HISTORICAL USAGE FOR BOTH        518

MOVE LOWER PRIORITY UE TO LOWER PRIORITY LAYER        520

HOST PACKET SESSION ON FREQUENCY LAYER        530

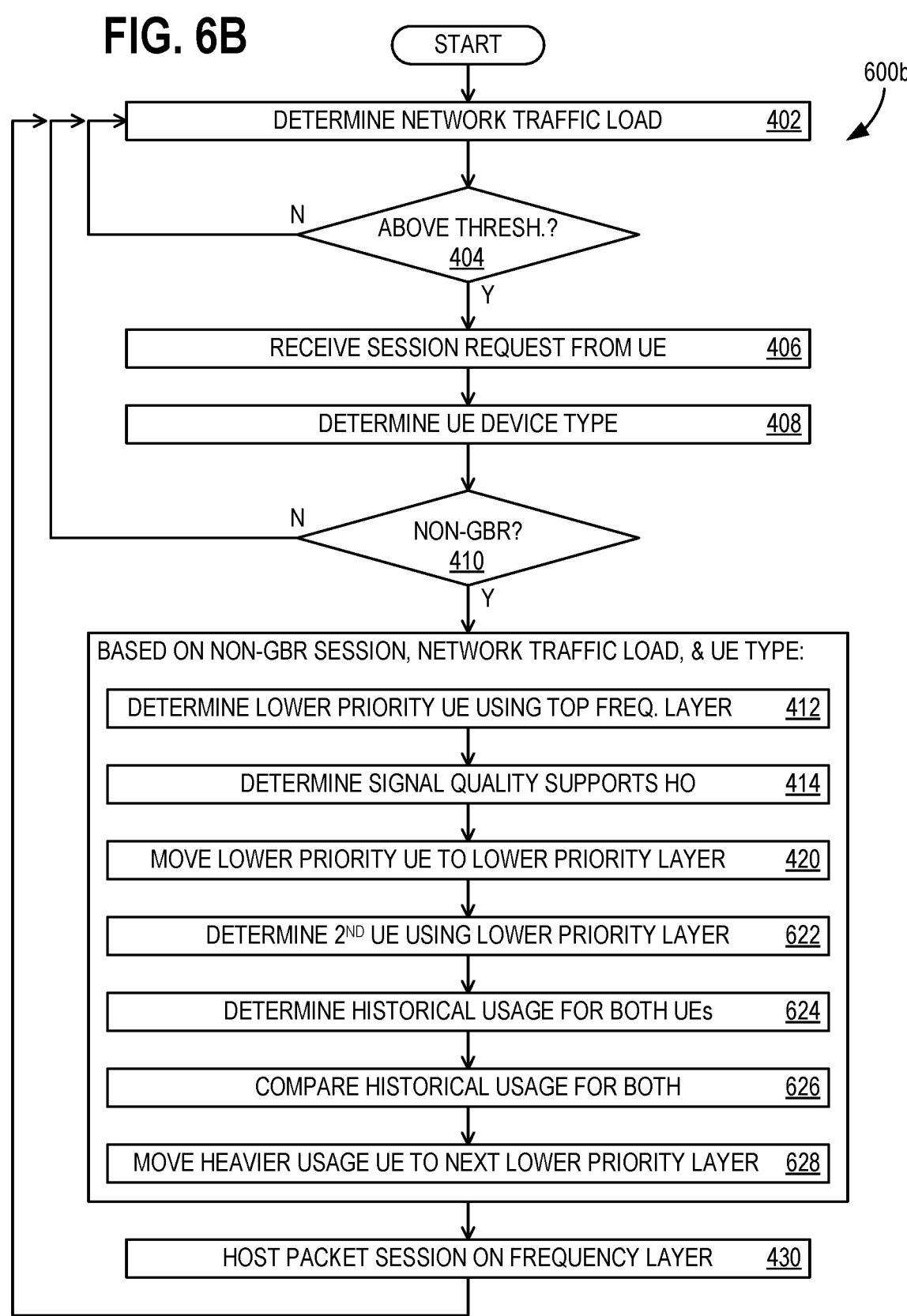

START

600b

DETERMINE NETWORK TRAFFIC LOAD — 402

N ← ABOVE THRESH.? 404

Y

RECEIVE SESSION REQUEST FROM UE — 406

DETERMINE UE DEVICE TYPE — 408

N ← NON-GBR? 410

Y

BASED ON NON-GBR SESSION, NETWORK TRAFFIC LOAD, & UE TYPE:

DETERMINE LOWER PRIORITY UE USING TOP FREQ. LAYER — 412

DETERMINE SIGNAL QUALITY SUPPORTS HO — 414

MOVE LOWER PRIORITY UE TO LOWER PRIORITY LAYER — 420

DETERMINE 2ND UE USING LOWER PRIORITY LAYER — 622

DETERMINE HISTORICAL USAGE FOR BOTH UEs — 624

COMPARE HISTORICAL USAGE FOR BOTH — 626

MOVE HEAVIER USAGE UE TO NEXT LOWER PRIORITY LAYER — 628

HOST PACKET SESSION ON FREQUENCY LAYER — 430

FIG. 7A

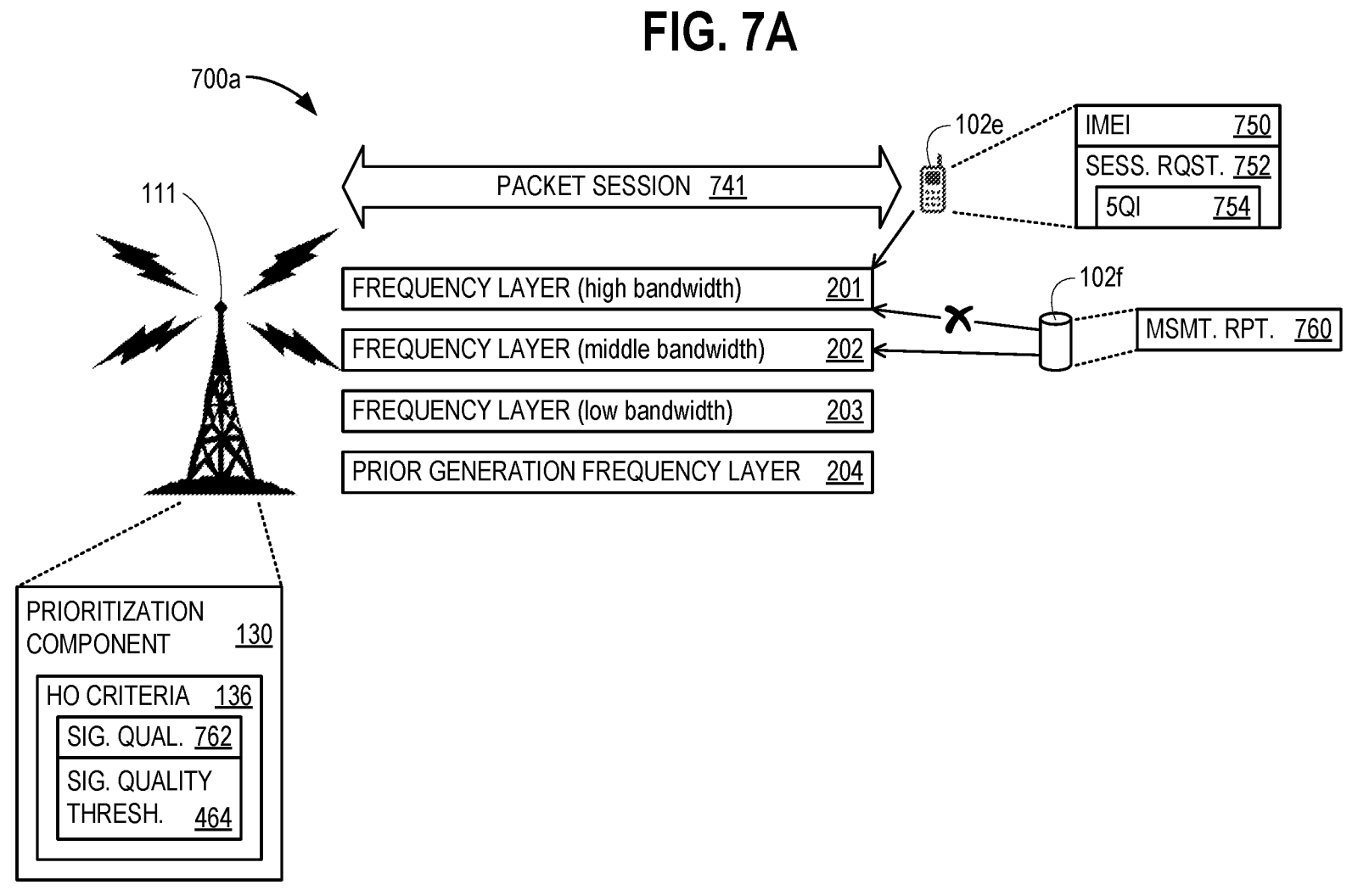

IMEI 750

SESS. RQST. 752

5QI 754

MSMT. RPT. 760

102e

102f

PACKET SESSION 741

FREQUENCY LAYER (high bandwidth) 201

FREQUENCY LAYER (middle bandwidth) 202

FREQUENCY LAYER (low bandwidth) 203

PRIOR GENERATION FREQUENCY LAYER 204

700a

111

PRIORITIZATION COMPONENT 130

HO CRITERIA 136

SIG. QUAL. 762

SIG. QUALITY THRESH. 464

Figure 9:
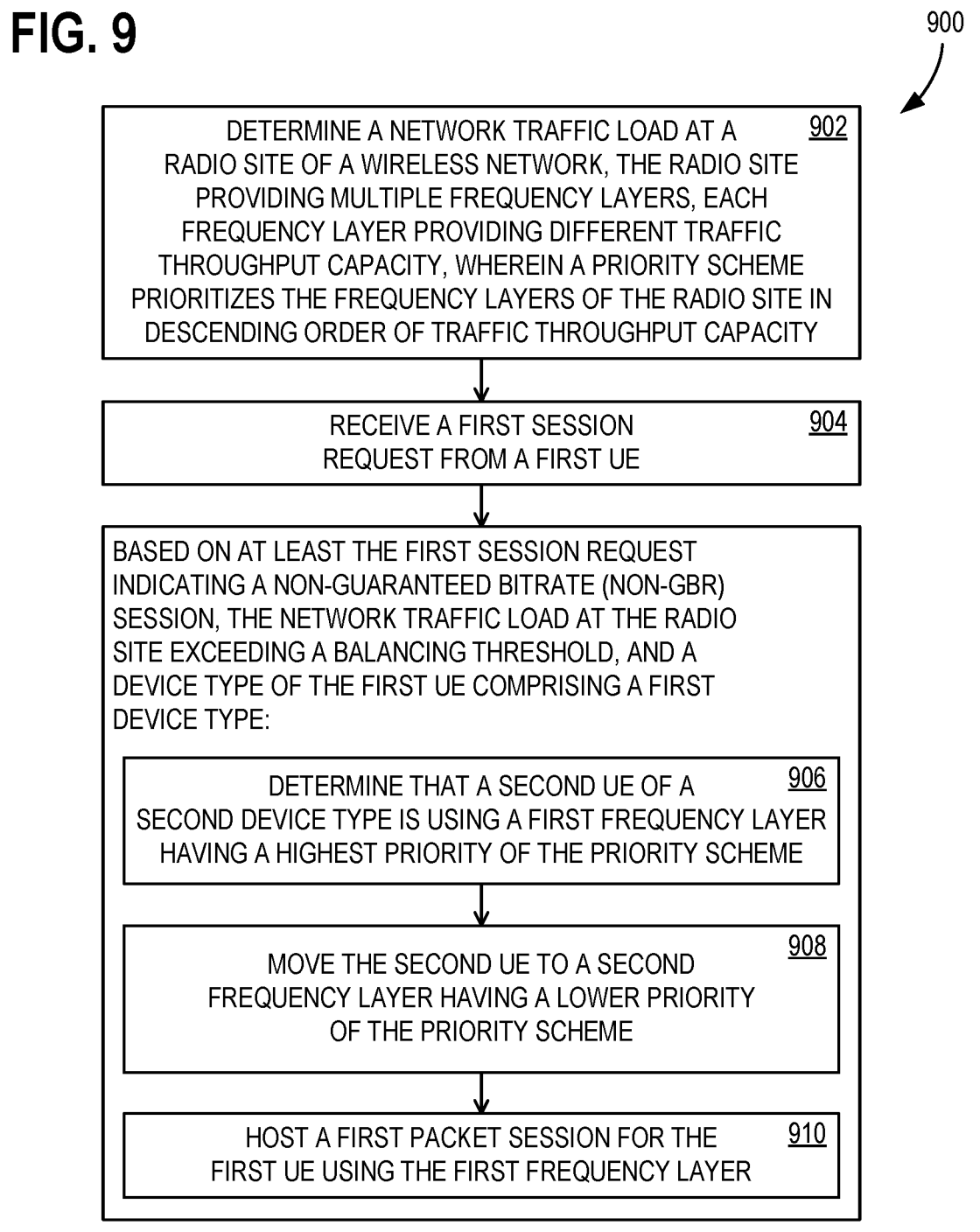

DETERMINE A NETWORK TRAFFIC LOAD AT A    902
RADIO SITE OF A WIRELESS NETWORK, THE RADIO SITE
PROVIDING MULTIPLE FREQUENCY LAYERS, EACH
FREQUENCY LAYER PROVIDING DIFFERENT TRAFFIC
THROUGHPUT CAPACITY, WHEREIN A PRIORITY SCHEME
PRIORITIZES THE FREQUENCY LAYERS OF THE RADIO SITE IN
DESCENDING ORDER OF TRAFFIC THROUGHPUT CAPACITY

RECEIVE A FIRST SESSION    904
REQUEST FROM A FIRST UE

BASED ON AT LEAST THE FIRST SESSION REQUEST
INDICATING A NON-GUARANTEED BITRATE (NON-GBR)
SESSION, THE NETWORK TRAFFIC LOAD AT THE RADIO
SITE EXCEEDING A BALANCING THRESHOLD, AND A
DEVICE TYPE OF THE FIRST UE COMPRISING A FIRST
DEVICE TYPE:

DETERMINE THAT A SECOND UE OF A    906
SECOND DEVICE TYPE IS USING A FIRST FREQUENCY LAYER
HAVING A HIGHEST PRIORITY OF THE PRIORITY SCHEME

MOVE THE SECOND UE TO A SECOND    908
FREQUENCY LAYER HAVING A LOWER PRIORITY
OF THE PRIORITY SCHEME

HOST A FIRST PACKET SESSION FOR THE    910
FIRST UE USING THE FIRST FREQUENCY LAYER

NETWORK LOAD BALANCING BASED ON DEVICE TYPE OR HISTORY

BACKGROUND

Modern cellular networks use multiple frequency layers, having different bandwidth, typically with higher frequencies providing greater bandwidth. Many cellular networks attempt to give each user equipment (UE) the best bandwidth, based on that UE's bandwidth capability. Several different types of UEs are in use in such networks, such as enhanced Mobile Broadband (eMBB, also known as cellphones or cellular telephones), fixed wireless access (FWA) commonly used as home internet access points, internet of things (IoT), and machine-to-machine communication (M2M), which are related to IoT UEs.

A UE's bandwidth capability depends on the radio chipset it uses. Different types of UEs (e.g., eMBB, FWA, IoT/M2M) may each use a chipset that is used by another UE type. When the number of UEs that have the capability to use the highest-bandwidth frequency layer exceeds the capacity of the cellular network, some UEs must be moved to lower bandwidth frequency layers. This is often accomplished using some supposedly "fair" criteria, such as random selection, round-robin selection, or order-of-arrival.

SUMMARY

The following summary is provided to illustrate examples disclosed herein, but is not meant to limit all examples to any particular configuration or sequence of operations.

Solutions are disclosed that perform network load balancing based on device type and/or history. Examples determine a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity; receive a first session request from a first UE; and based on at least the first session request indicating a non-guaranteed bitrate (non-GBR) session, the network traffic load at the radio site exceeding a balancing threshold, and a device type of the first UE comprising a first device type: determine whether a second UE of a second device type is using a first frequency layer having a highest priority of the priority scheme; move the second UE to a second frequency layer having a lower priority of the priority scheme; and host a first packet session for the first UE using the first frequency layer.

BRIEF DESCRIPTION OF THE DRAWINGS

The disclosed examples are described below with reference to the accompanying drawing figures listed below, wherein:

FIG. 3 illustrates an exemplary priority scheme as may be used in examples of the architecture of FIG. 1;

FIG. 4A illustrates an example scenario of UE prioritization as may occur when using examples of the architecture of FIG. 1;

FIG. 5A illustrates another example scenario of UE prioritization as may occur when using examples of the architecture of FIG. 1;

FIG. 5B illustrates a flowchart of exemplary operations associated with the scenario of FIG. 5A;

FIG. 6A illustrates another example scenario of UE prioritization as may occur when using examples of the architecture of FIG. 1;

FIG. 6B illustrates a flowchart of exemplary operations associated with the scenario of FIG. 6A;

FIG. 7A illustrates another example scenario of UE prioritization as may occur when using examples of the architecture of FIG. 1;

FIG. 9 illustrates another flowchart of exemplary operations associated with the architecture of FIG. 1.

Figure 1:
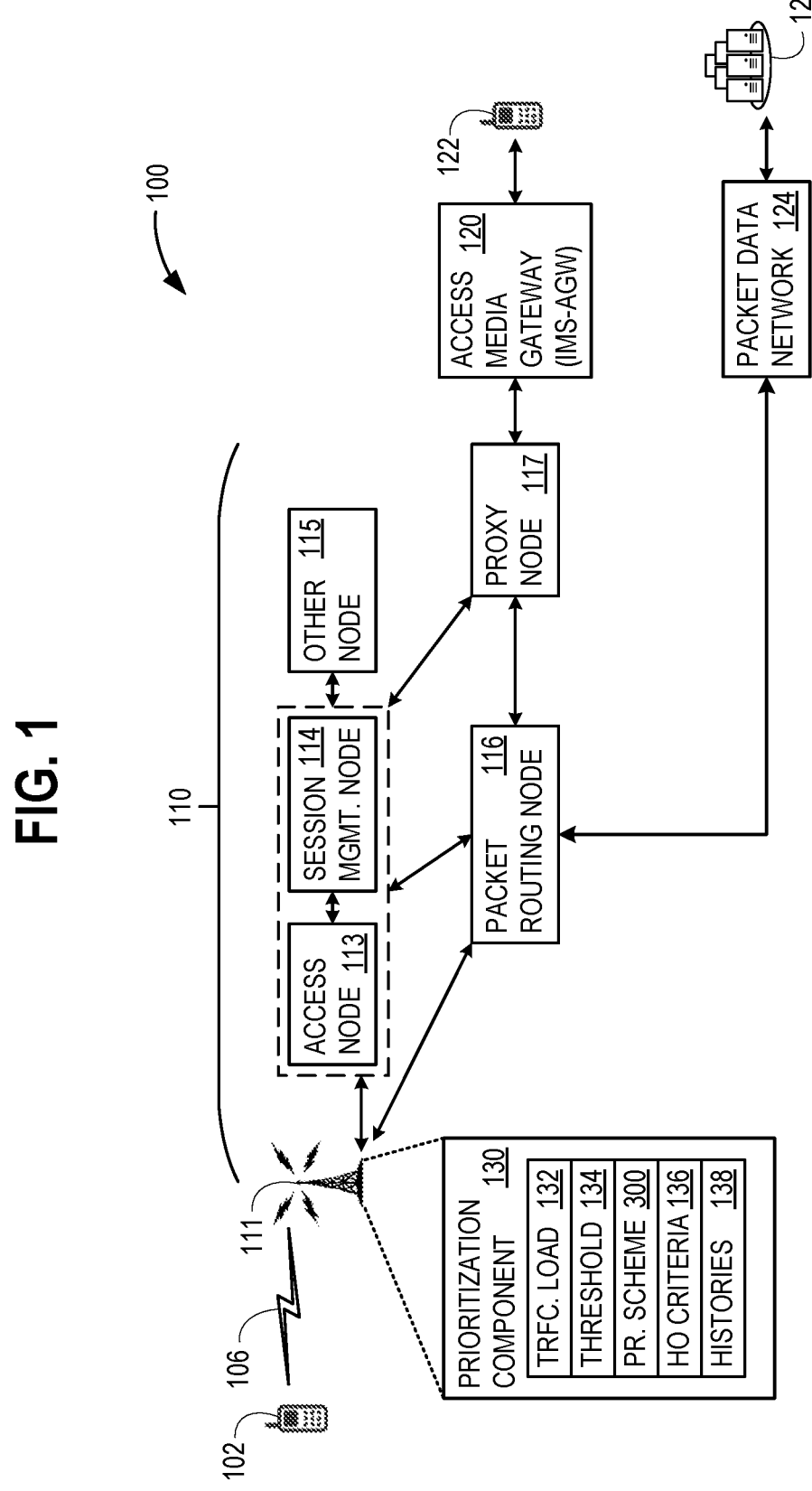
FIG. 1 illustrates an exemplary architecture that advantageously performs network load balancing based on device type and/or history.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Although cellular networks use "fair" criteria, such as random selection, round-robin selection, or order-of-arrival to select user equipment (UEs) to move to lower-bandwidth frequency layers, even if all UEs have the same chipset, not all UEs consume resources equally, or are equally delay-sensitive. For example, a human operating an enhanced Mobile Broadband (eMBB) UE is more likely to notice bandwidth-induced delays, and become unsatisfied with the radio service, whereas users and systems employing a fixed wireless access (FWA) UE, an internet of things (IoT) UE, or a machine-to-machine communication (M2M) UE. Meanwhile, a single FWA UE may consume as much network bandwidth as 10 eMBB UEs.

Current off-loading schemes, which select UEs for off-loading to lower-bandwidth frequency layers do not take into account UE bandwidth usage history and device type. This means that several human users may be less than satisfied with their experience, while a single FWA (that is less delay-sensitive) is heavily using network resources on the highest-bandwidth frequency layer.

Solutions are disclosed that perform network load balancing based on device type and/or history. Examples determine UE device type and/or bandwidth usage history, and prioritize certain UEs (e.g., eMBB) for higher-bandwidth frequency layers than other UE types (e.g., FWA, IoT/M2M) and/or UEs that have a history of heavy bandwidth use. This enhances the user experience for a larger number of delay-sensitive users.

Aspects of the disclosure improve the performance of cellular networks by prioritizing bandwidth for delay-sensitive users in a manner that maximizes the number of different users enjoying the higher bandwidth. This reduces negative impacts on a larger number of network users, when contention for bandwidth necessarily drives some users to lower-bandwidth frequency layers that are below the capacity of the user's device. These advantageous results are accomplished, at least in part by, based on at least a session request indicating a non-guaranteed bitrate (non-GBR) session, network traffic load at a radio site exceeding a balancing threshold, and a device type of the UE (requesting the session) comprising a first device type, moving a UE of a second device type to a frequency layer having a lower priority of a priority scheme.

With reference now to the figures, FIG. 1 illustrates an exemplary architecture 100 that advantageously performs network load balancing based on device type and/or history. A wireless network 110 is illustrated that is serving a UE 102. UE 102 may be an eMBB (e.g., a cellular telephone such as a smartphone), but may also represent other telecommunication devices capable of using a wireless network, such as an FWA, IoT, M2M, or personal computer (PC, e.g., desktop, notebook, tablet, etc.) with a cellular modem. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network.

UE 102 uses an air interface 106 to communicate with a base station 111 of wireless network 110, such that base station 111 is the serving base station for UE 102 (providing the serving cell). In some scenarios, base station 111 may be referred to as a radio access network (RAN). Wireless network 110 has an access node 113, a session management node 114, another control plane node 115, and other components (not shown). Wireless network 110 also has a packet routing node 116 and a proxy node 117. Access node 113, session management node 114, and node 115 are within a control plane of wireless network 110, and packet routing node 116 is within a data plane (a.k.a. user plane) of wireless network 110.

Base station 111 is in communication with access node 113 and packet routing node 116. Access node 113 is in communication with session management node 114, which is in communication with node 115, packet routing node 116 and proxy node 117. Packet routing node 116 is in communication with proxy node 117, and packet data network 124. In some 5G examples, base station 111 comprises a gNodeB (gNB), access node 113 comprises an access mobility function (AMF), session management node 114 comprises a session management function (SMF), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), and packet routing node 116 comprises an SAEGW-user plane (SAEGW-U). In some examples, proxy node 117 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 117 is in communication with an internet protocol (IP) multimedia system (IMS) access gateway (IMS-AGW) 120 within an IMS, in order to provide connectivity to other wireless (cellular) networks, such as for a call with UE 122 or a public switched telephone system (PSTN, also known as plain old telephone system, POTS). In some examples, proxy node 117 may be considered to be within the IMS. UE 102 reaches network resource 126 using packet data network 124 (or IMS-AGW 120, in some examples). Data packets from UE 102 pass through at least base station 111 and packet routing node 116 on their way to packet data network 124 or IMS-AGW 120 (via proxy node 117).

Figure 2:
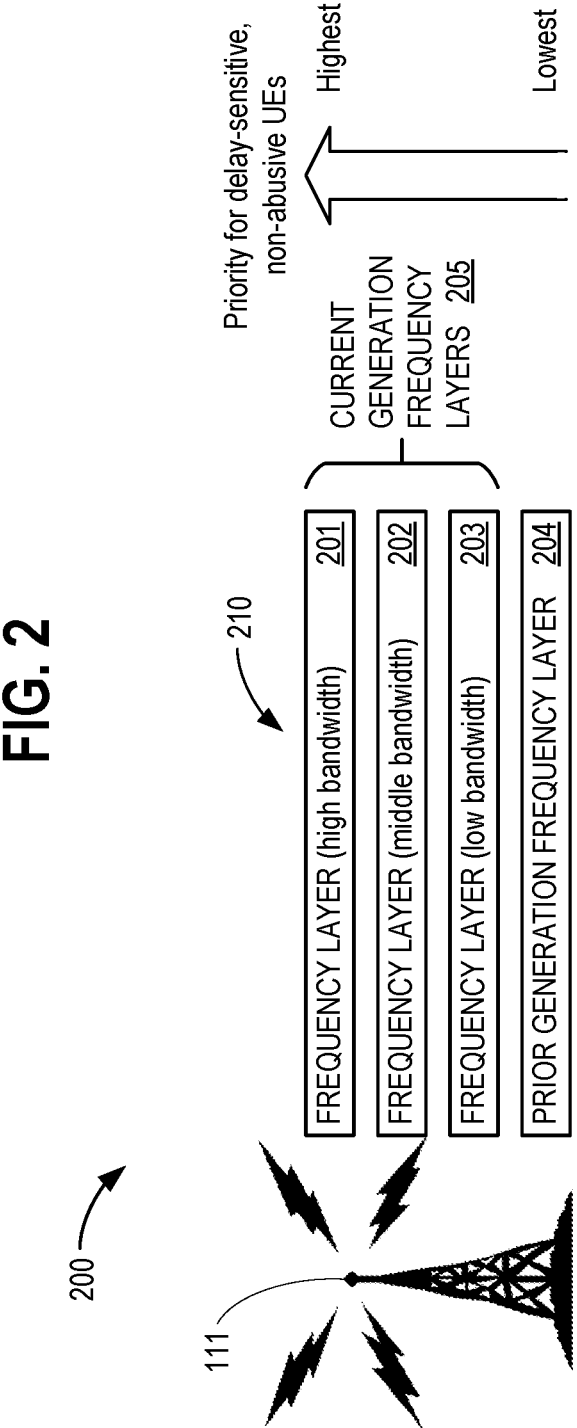
FIG. 2 illustrates an exemplary radio site as may be used in examples of the architecture of FIG. 1.

A prioritization component 130 performs network load balancing based on device type and/or history for frequency layers at a radio site 200 of wireless network 110, which is shown in further detail in FIG. 2, but represented within FIG. 1 by base station 111. Prioritization component 130 determines a network traffic load 132 for network traffic passing through at least base station 111, for comparison against a balancing threshold 134. When network traffic load 132 exceeds balancing threshold 134, prioritization component 130 uses a priority scheme 300 (shown in further detail in FIG. 3) to select UEs for off-loading to lower-bandwidth frequency layers. Prioritization component 130 uses handover (HO) criteria 136 and UE usage histories 138. The functionality of prioritization component 130 is described in further detail in relation to FIGS. 3-8. Although prioritization component 130 is illustrated as being located at base station 111, it should be understood that prioritization component 130 may be located elsewhere within wireless network 110, and/or the functionality described herein for prioritization component 130 may be distributed among multiple nodes of wireless network 110.

Although FIG. 1 and some of the following figures are described using an example of a cellular network, it should be understood that the teachings herein are applicable to other types of wireless networks. To benefit from the teachings herein, another type of wireless network should offer zones of overlapping frequency layers having different throughput capacities (e.g., bandwidths either on the air interface or behind the air interface) and have different classes of users, classified by user equipment type and/or different typical user behaviors, such that some users with histories of low volume traffic usage can be expected to continue that low volume traffic usage with a reasonable likelihood, while other users with histories of high volume traffic usage can be expected to continue that high volume traffic usage with a reasonable likelihood. With such features, another type of wireless network, other than a cellular network, may also benefit from the disclosure herein.

FIG. 2 illustrates radio site 200 located at base station 111. Such an arrangement is common when a cell tower site hosts multiple cells. A similar arrangement may also exist in non-cellular wireless networks. Although all of the antennas may be located on a single antenna tower, in some examples, other examples may use different antenna towers that are spaced closely enough to provide overlapping radio coverage.

Radio site 200 has multiple frequency layers 210, which include a frequency layer 201, a frequency layer 202, and a frequency layer 203. In some examples, different base stations at radio site provide the different frequency layers. In some examples, radio site 200 comprises a cell site, and each frequency layer comprises a cellular air interface frequency layer.

Frequency layers 201-203 are current radio generation frequency layers 205, with frequency layer 201 having the highest bandwidth and frequency layer 203 having the lowest bandwidth of current radio generation frequency layers 205. As a result, of current radio generation frequency layers 205, frequency layer 201 has the highest priority for delay-sensitive UEs that are not abusing bandwidth, and frequency layer 203 has the lowest priority. In some examples, frequency layer 201 is approximately 2,500 megahertz (MHz), frequency layer 202 is approximately 1,900 MHz, and frequency layer 203 is approximately 700 MHz. Other frequencies may be used, as well as a different number of frequency layers.

In this illustrated example, multiple frequency layers 210 also includes a prior radio generation frequency layer 204, which may be prioritized lower for delay-sensitive UEs that are not abusing bandwidth than is frequency layer 203. In some examples, this priority may hold even if prior radio generation frequency layer 204 has higher bandwidth than frequency layer 203, although some examples may instead include prior radio generation frequency layer 204 within the priority ranking of multiple frequency layers 210 solely according to bandwidth.

FIG. 3 illustrates an example of priority scheme 300. Priority scheme 300 has a frequency prioritization table 302, a device type look-up table 320, and a device prioritization table 330. Frequency prioritization table 302 has current radio generation frequency layers 205 and prior radio generation frequency layer 204. A highest priority frequency layer 304 is identified as frequency layer 201, a lower priority frequency layer 306 is identified as frequency layer 202, and lowest priority frequency layer 308 is identified as frequency layer 203. "Lower" is relative, in that lower priority frequency layer 306 is lower in priority than highest priority frequency layer 304, but is higher in priority than lowest priority frequency layer 308.

"Lowest" is also used within a certain context. In priority scheme 300, lowest priority frequency layer 308 has the lowest priority within current radio generation frequency layers 205, but is higher in priority than prior radio generation frequency layer 204. Thus, lowest priority frequency layer 310 (the lowest priority of all frequency layers at radio site 200) is identified as prior radio generation frequency layer 204. In some examples, there may be more than just a single prior radio generation frequency layer. In such examples, priority scheme 300 further prioritizes within those multiple prior radio generation frequency layers, according.

The prioritization may be based on air interface bandwidth, although some examples may include bandwidth of equipment at radio site 200 that affects traffic throughput capacity. The prioritization is thus generalized herein as traffic throughput capacity, which may be measured by frequency layer bandwidth in some examples. Priority scheme 300 prioritizes current radio generation frequency layers in descending order of traffic throughput capacity, followed by prior radio generation frequency layer 204. In some examples, priority scheme 300 has three tiers or more. As described above, highest priority frequency layer 304 has a higher traffic throughput capacity than lower priority frequency layer 306. Priority scheme 300 prioritizes frequency layer 201 above frequency layer 202 and frequency layer 202 above frequency layer 203, based on at least frequency layer 201 providing a higher traffic throughput capacity than frequency layer 202 and frequency layer 202 providing a higher traffic throughput capacity than frequency layer 203. Priority scheme 300 prioritizes current radio generation frequency layers in descending order of traffic throughput capacity, followed by prior radio generation frequency layer 204. In some examples, the current radio generation comprises 5G and the prior radio generation comprises 4G.

Device type look-up table 320 has a column of device types 321 and a column of type allocation code (TAC) values 323. When a UE registers with wireless network 110, it sends its international mobile equipment identity (IMEI). The first eight digits of the IMEI is the UE's TAC. The TAC indicates the manufacturer and model of the UE, such that all UE models from a particular manufacturer will have the same TAC. Column of device types 321 shows a placeholder device type 322 that is mapped to a placeholder TAC 324 in column of TAC values 323. Prioritization component 130 is able to determine a device type of a UE be extracting the TAC from the UE's IMEI and finding the mapping within device type look-up table 320. Other solutions for identifying UE device type may also be used, in some examples.

Device prioritization table 330 has a column of device types 334 with each device type mapped to a priority level in column of priority levels 344. A device type 331 is shown as eMBB (or cellular telephone) and has a priority level 341 (highest priority, in this example). A device type 332 is shown as FWA and has a priority level 342, which is lower than priority level 341. A device type 333 is shown as IoT/M2M and has a priority level 343, which is lower than priority level 341, and which may be higher than, the same as, or lower than priority level 343.

Some IoT and M2M devices may be delay-sensitive, such as devices executing virtual reality (VR) and augmented reality (AR) software applications. In such examples, device prioritization table 330 may include further criteria for differentiating between uses of UEs within a single device type.

Figure 4A:
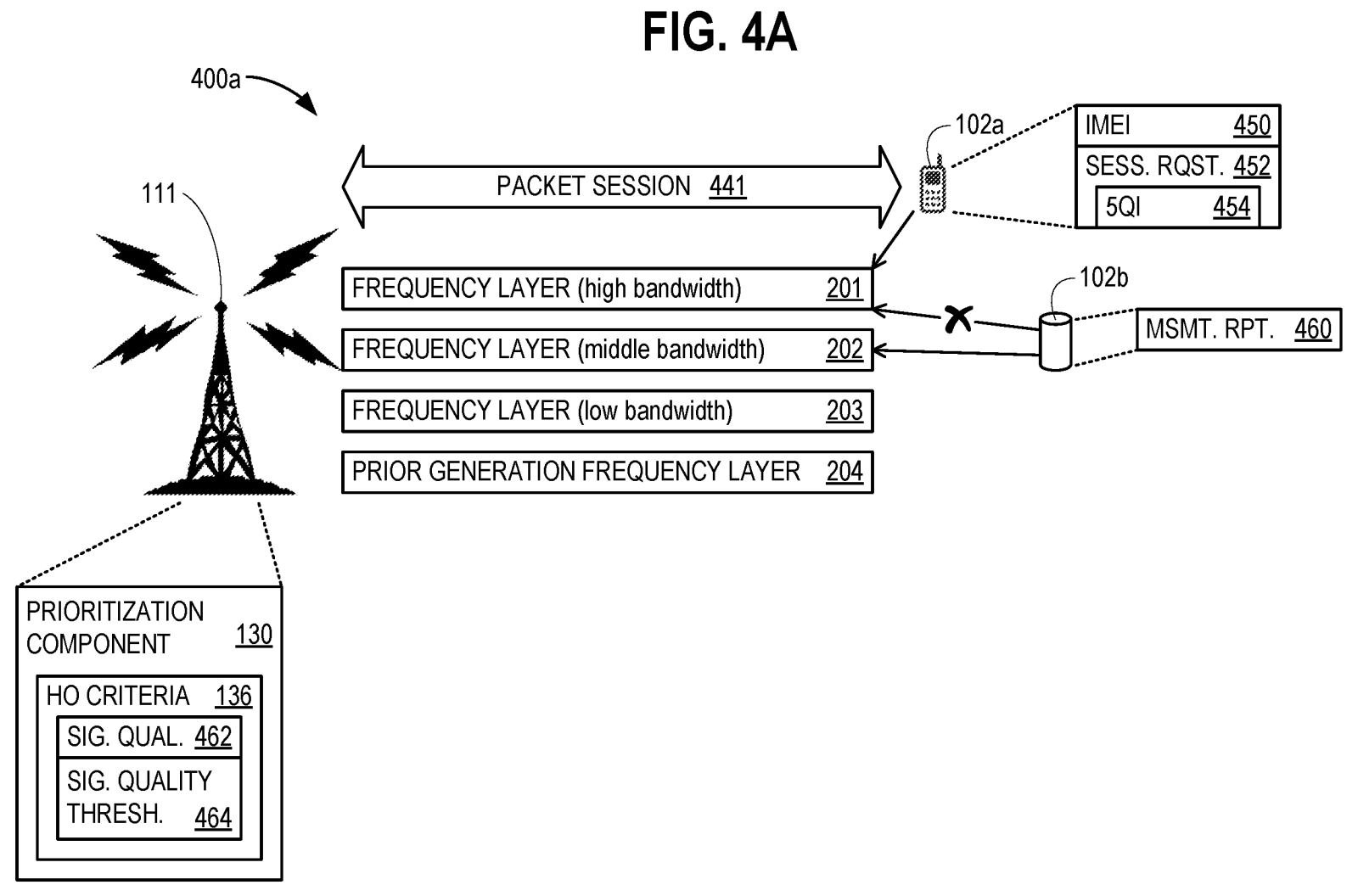

FIG. 4A illustrates an example scenario 400a in which prioritization component 130 assigns a UE 102a to frequency layer 201 for a packet session 441, and off-loads a UE 102b from frequency layer 201 to frequency layer 202. UE 102a transmits its IMEI 450 to base station 111, along with a session request 452 that includes a 5G quality of service (QoS) indicator (5QI) 454. A 5QI value of 5 through 9 indicates a non-GBR session. In this illustrated example, prioritization component 130 uses 5QI 454 to determine that UE 102a is requesting a non-GBR session with session request 452. IMEI 450 indicates that UE 102a is an eMBB device.

UE 102b, an FWA, is initially using frequency layer 201 for a non-GBR session, but has been making measurements of neighboring base stations, and so has a measurement report 460 showing a signal quality 462 for frequency layer 202. UE 102b sends measurement report 460 to base station 111, enabling prioritization component 130 to determine signal quality 462. HO criteria 136 includes signal quality threshold 464 for instructing a handover, which is met in this example.

Prioritization component 130 thus moves UE 102b to frequency layer 202 (i.e., UE 102a bumps UE 102b to a lower priority frequency layer). This may be accomplished by instructing (initiating) a handover of UE 102b from frequency layer 201 to frequency layer 202, or another frequency layer (e.g., frequency layer 203 or prior radio generation frequency layer 204). If the handover is from frequency layer 201 to frequency layer 202 or frequency layer 203, this is an inter-frequency handover (IFHO). If the handover is from frequency layer 201 to prior radio generation frequency layer 204, this is an inter-radio access tech-nology (inter-RAT) handover.

Figure 4B:
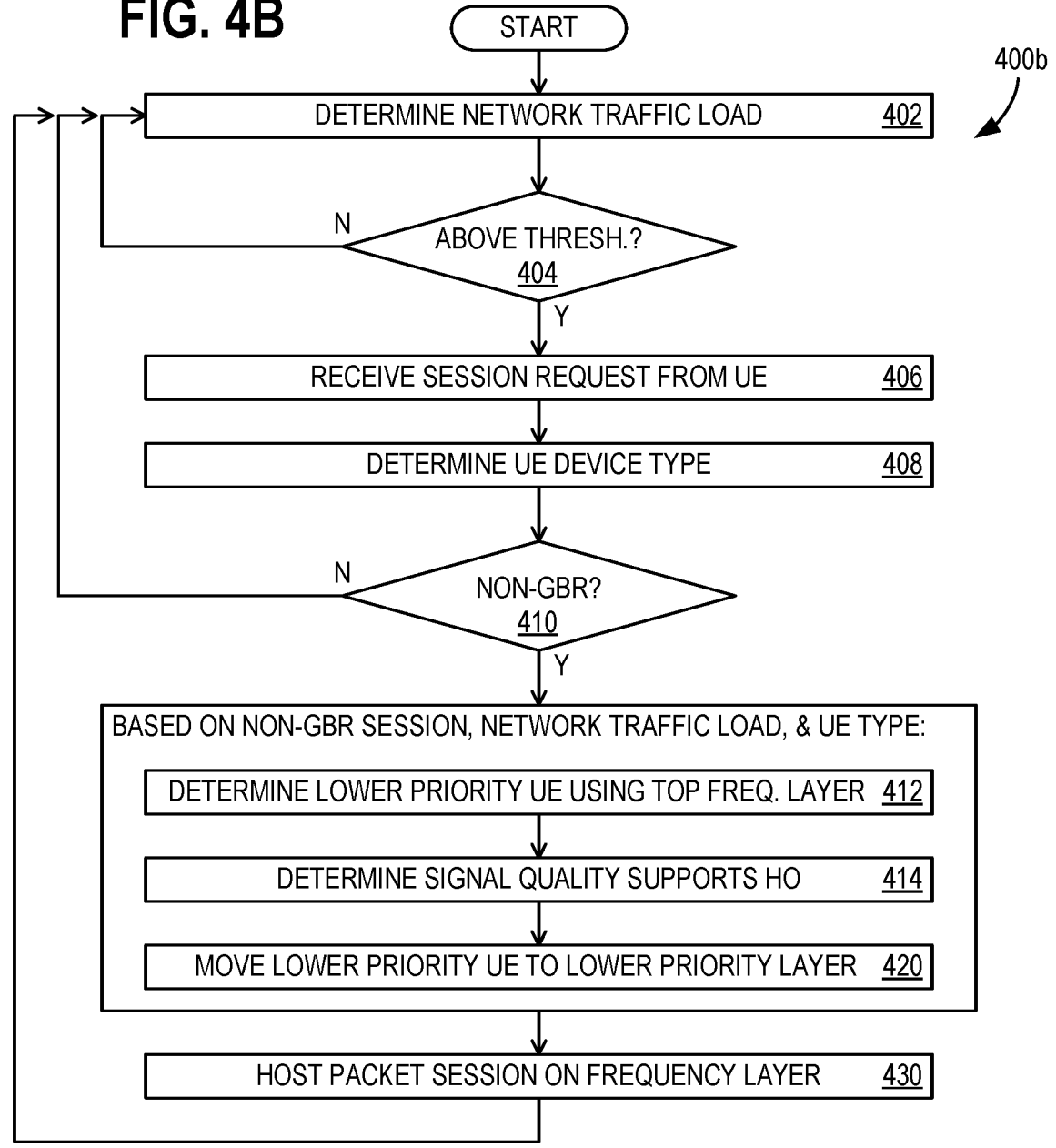
FIG. 4B illustrates a flowchart of exemplary operations associated with the scenario of FIG. 4A.

FIG. 4B illustrates a flowchart 400b of exemplary opera-tions associated with scenario 400a. In some examples, at least a portion of flowchart 400b may be performed using one or more computing devices 1000 of FIG. 10. Flowchart 400b commences with determining network traffic load 132 at radio site 200 in operation 402. In some examples, determining network traffic load 132 at radio site 200 comprises monitoring network traffic load 132 at radio site 200. In some examples, traffic throughput capacity is mea-sured by air interface bandwidth.

Decision operation 404 determines whether network traf-fic load 132 at radio site 200 exceeds balancing threshold 134. If not, no action is taken, and flowchart 400b returns to operation 402 to continue monitoring network traffic load 132. Otherwise, flowchart 400b proceeds.

Session request 452 is received from UE 102a in opera-tion 406. In some examples, session request 452 includes IMEI 450 of UE 102a, although IMEI 450 may be received from UE 102a at another time. Prioritization component 130 determines device type 322 of UE 102a, such as by using TAC 324 of IMEI 450, in operation 408. Decision operation 410 determines whether session request 452 indicates a non-GBR session. If not, or if UE 102 is not a prioritized device type (e.g., not device type 331 (eMBB)), flowchart 400b returns to operation 402.

Operations 412-420 are performed based on at least session request 452 indicating a non-GBR session, network traffic load 132 at radio site 200 exceeding balancing thresh-old 134, and device type 322 of UE 102a comprising device type 331 (i.e., eMBB or cellular telephone). In some examples, other device types may be prioritized, including some device types executing certain delay-sensitive soft-ware applications.

In operation 412, prioritization component 130 deter-mines that UE 102b of device type 332 (i.e., FWA) is using frequency layer 201 for a non-GBR session. In operation 414, prioritization component 130 determines that signal quality 462 of frequency layer 202, received by UE 102b, supports a handover of UE 102b to frequency layer 202 (e.g., based on at least measurement report 460 of UE 102b and signal quality threshold 464). UE 102b moves to fre-quency layer 202 in operation 420. Wireless network 110 hosts packet session 441 for UE 102a using frequency layer 201 in operation 430, and flowchart 400b returns to opera-tion 402.

Figure 5A:
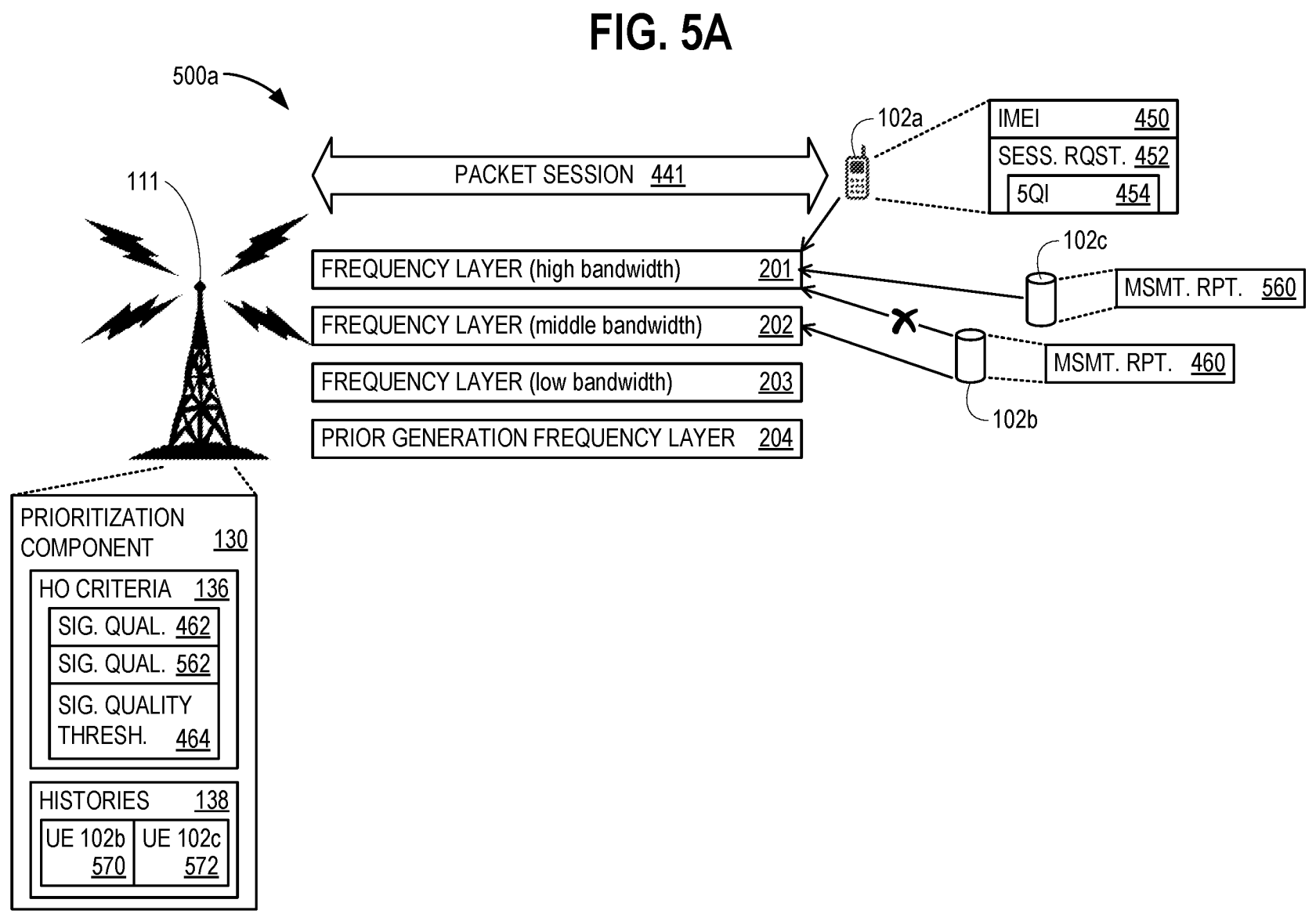

FIG. 5A illustrates a scenario 500a, in which two lower priority UE (UE 102b and a UE 102c) are using frequency layer 201, and prioritization component 130 selects one of them (UE 102b) for off-loading to frequency layer 202 after comparing their bandwidth usage histories. Scenario 500a largely follows scenario 400a, described earlier, but with the addition of UE 102c. UE 102c makes a measurement report 560, which includes frequency layer 202.

Prioritization component 130 notes that both UE 102b and UE 102c meet HO criteria 136, because both signal quality 462 for UE 102b and signal quality 562 for UE 102c (extracted from measurement report 560) meet signal quality threshold 464. If signal quality 562 did not meet signal quality threshold 464, then prioritization component 130 would exclude UE 102c from consideration for off-loading to frequency layer 202. In some examples, if the signal quality was sufficient for UE 102c to be off-loaded to frequency layer 203, this may be the result. However, in illustrated scenario 500a, UE 102c is eligible for off-loading to frequency layer 202.

Prioritization component 130 collects a historical usage 570 of UE 102b and a historical usage 572 of UE 102c, compares them and determines that UE 102b is the heavier user. Therefore, prioritization component 130 selects UE 102b over UE 102c for off-loading to frequency layer 202.

FIG. 5B illustrates a flowchart 500b of exemplary opera-tions associated with scenario 500a. In some examples, at least a portion of flowchart 500b may be performed using one or more computing devices 1000 of FIG. 10. Flowchart 500b follows flowchart 400b from operation 402 through decision operation 410.

Operations 412-520 are performed based on at least session request 452 indicating a non-GBR session, network traffic load 132 at radio site 200 exceeding balancing thresh-old 134, and device type 322 of UE 102a comprising device type 331 (i.e., eMBB or cellular telephone). Prioritization component 130 determines that both UE 102b and UE 102c of device type 332 are using frequency layer 201 in opera-tion 512, and determines that signal quality 462 and signal quality 562 support the handover of UE 102b and UE 102c to frequency layer 202 in operation 514.

In operation 516, prioritization component 130 deter-mines historical usage 570 of UE 102b and historical usage 572 of UE 102c, and compares historical usage 570 with historical usage 572 in operation 518. UE 102b moves to frequency layer 202 in operation 530, based on at least historical usage 570 of UE 102b exceeding historical usage 572 of UE 102c.

Figure 6A:
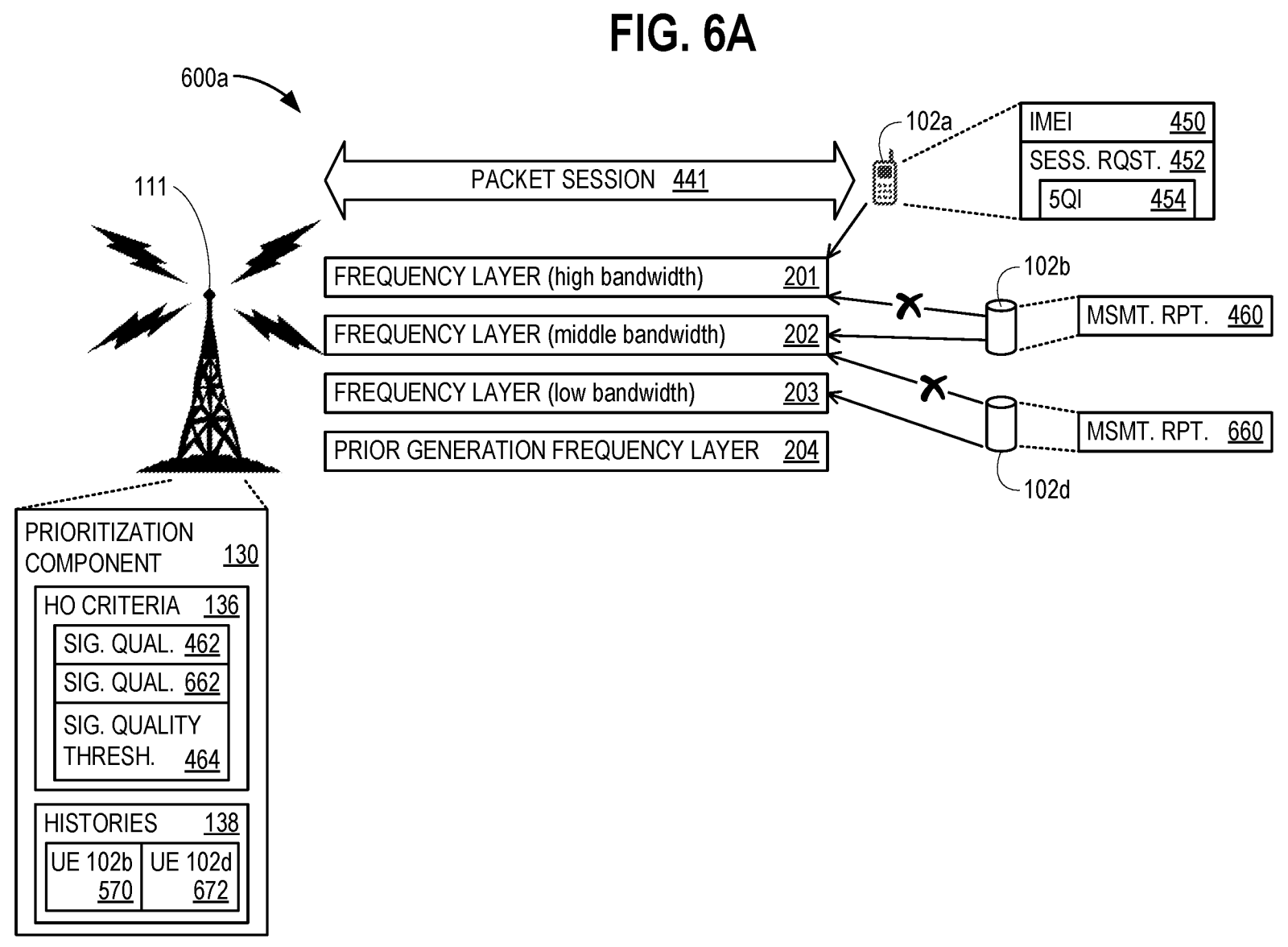

FIG. 6A illustrates a scenario 600a in which UE 102b moving to frequency layer 202 bumps a UE 102d to fre-quency layer 203. Scenario 600a largely follows scenario 400a, described earlier, but with the addition of UE 102d. UE 102d makes a measurement report 660, which includes frequency layer 203.

Prioritization component 130 notes that both UE 102b and UE 102d meet HO criteria 136, because both signal quality 462 for UE 102b and signal quality 662 for UE 102d (extracted from measurement report 560) meet signal quality threshold 464. (Some examples may use different signal quality thresholds for different frequency layers).

Prioritization component 130 collects a historical usage 570 of UE 102b and a historical usage 672 of UE 102c, compares them and determines that UE 102b is the heavier user. Therefore, when prioritization component 130 off-loads UE 102b to frequency layer 202, prioritization com-ponent 130 selects UE 102b to remain on frequency layer 202 and further selects UE 102c for off-loading to frequency layer 203. In some examples, if UE 102c had been the heaver user, and there was not room on frequency layer 202 for UE 102b, prioritization component 130 would instead move UE 102b to frequency layer 203.

FIG. 6B illustrates a flowchart 600b of exemplary opera-tions associated with scenario 600a. In some examples, at least a portion of flowchart 600b may be performed using one or more computing devices 1000 of FIG. 10. Flowchart 600b follows flowchart 400b from operation 402 through operation 420, and also for operation 430.

In operation 622, prioritization component 130 deter-mines that UE 102d of device type 332 is using frequency layer 202, and determines historical usage 672 of UE 102d in operation 624. Historical usage 570 of UE 102b is compared with historical usage 672 of UE 102d in operation 626, and UE 102b is found to be the heaver user. In operation 628, prioritization component 130 moves UE 102d to fre-quency layer 203 based on at least historical usage 672 of UE 102d exceeding historical usage 570 of UE 102b.

FIG. 7A illustrates a scenario 700*a*, in which (similarly to scenario 400*a*) prioritization component 130 assigns a UE 102*e* to frequency layer 201 for a packet session 741, and off-loads a UE 102*f* (an IoT/M2M device) from frequency layer 201 to frequency layer 202.

UE 102*e* transmits its IMEI 750 to base station 111, along with a session request 752 that includes a 5QI 754. Prioritization component 130 uses 5QI 754 to determine that UE 102*e* is requesting a non-GBR session with session request 752. IMEI 750 indicates that UE 102*e* is an eMBB device.

UE 102*f*, an IoT/M2M device, is initially using frequency layer 201 for a non-GBR session, but has been making measurements of neighboring base stations, and so has a measurement report 760 showing a signal quality 762 for frequency layer 202. UE 102*f* sends measurement report 760 to base station 111, enabling prioritization component 130 to determine that signal quality 762 meets signal quality threshold 464. Prioritization component 130 thus moves UE 102*f* to frequency layer 202 (i.e., UE 102*e* bumps UE 102*f* to a lower priority frequency layer).

Figure 7B:
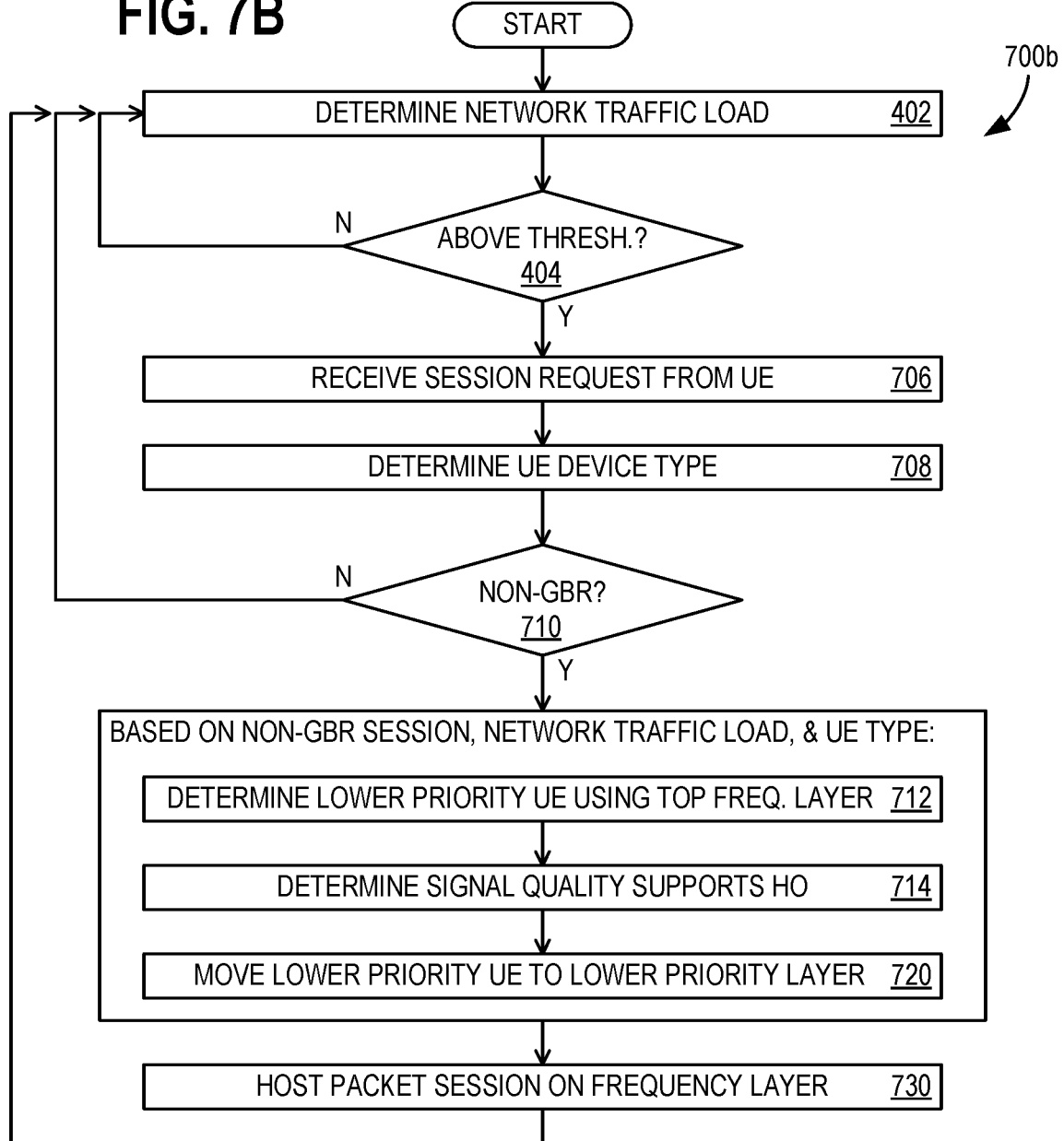
FIG. 7B illustrates a flowchart of exemplary operations associated with the scenario of FIG. 7A.

FIG. 7B illustrates a flowchart 700*b* of exemplary operations associated with scenario 700*a*. In some examples, at least a portion of flowchart 700*b* may be performed using one or more computing devices 1000 of FIG. 10. Flowchart 700*b* follows flowchart 400*b* from operation 402 through decision operation 404. Session request 752 is received from UE 102*e* in operation 706. In some examples, session request 752 includes IMEI 750 of UE 102*a*, although IMEI 750 may be received from UE 102*a* at another time. Prioritization component 130 determines device type 322 of UE 102*a*, such as by using TAC 324 of IMEI 750, in operation 708. Decision operation 710 determines whether session request 752 indicates a non-GBR session. If not, or if UE 102 is not a prioritized device type (e.g., not device type 331 (eMBB)), flowchart 700*b* returns to operation 402.

Operations 712-720 are performed based on at least session request 752 indicating a non-GBR session, network traffic load 132 at radio site 200 exceeding balancing threshold 134, and device type 322 of UE 102*a* comprising device type 331 (i.e., eMBB or cellular telephone). In some examples, other device types may be prioritized, including some device types executing certain delay-sensitive software applications.

In operation 712, prioritization component 130 determines that UE 102*f* of device type 333 (i.e., IoT/M2M) is using frequency layer 201 for a non-GBR session. In operation 714, prioritization component 130 determines that signal quality 762 of frequency layer 202, received by UE 102*f*, supports a handover of UE 102*f* to frequency layer 202 (e.g., based on at least measurement report 760 of UE 102*f* and signal quality threshold 464). UE 102*f* moves to frequency layer 202 in operation 720. Wireless network 110 hosts packet session 741 for UE 102*a* using frequency layer 201 in operation 730, and flowchart 700*b* returns to operation 402.

Figure 8:
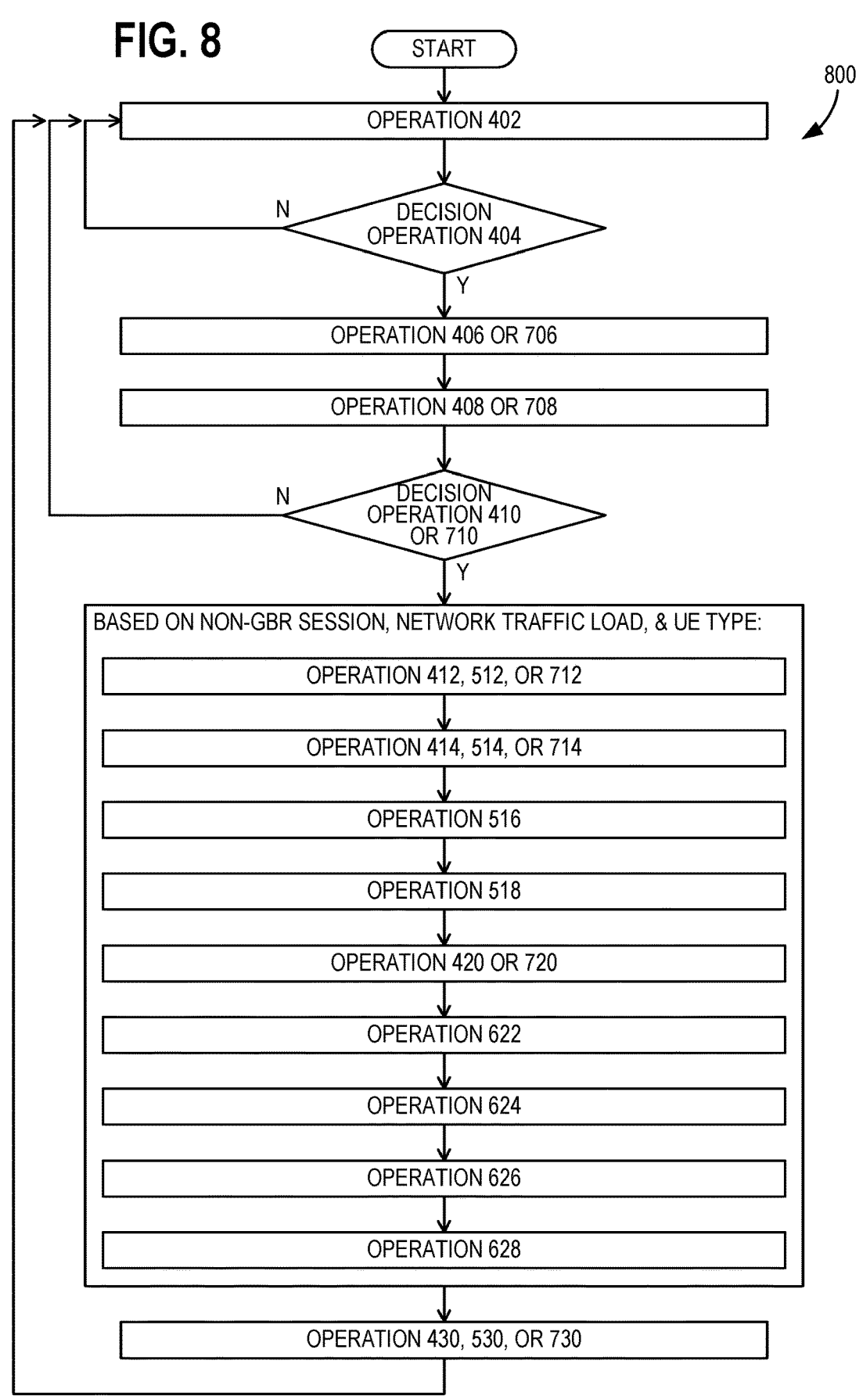
FIG. 8 illustrates a flowchart of exemplary operations associated with the architecture of FIG. 1, and that combines the operations of the flowcharts of FIGS. 5B, 6B, and 7B.

FIG. 8 illustrates a flowchart 800 of that combines flowcharts 400*b*, 500*b*, 600*b*, and 700*b*. The descriptions of each operation are as given earlier. Architecture 100 is able to handle all of the above-described scenarios 400*a*, 500*a*, 600*a*, and 700*a* using the generic flowchart 800, specializing into the respective one of flowcharts 400*b*, 500*b*, 600*b*, and 700*b* based on the specific scenario faced.

FIG. 9 illustrates a flowchart 900 of exemplary operations associated with examples of architecture 100. In some examples, at least a portion of flowchart 900 may be performed using one or more computing devices 1000 of FIG. 10. Flowchart 900 commences with operation 902, which includes determining a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity. Operation 904 includes receiving a first session request from a first UE.

Operations 906-910 are performed based on at least the first session request indicating a non-guaranteed bitrate (non-GBR) session, the network traffic load at the radio site exceeding a balancing threshold, and a device type of the first UE comprising a first device type. Operation 906 includes determining that a second UE of a second device type is using a first frequency layer having a highest priority of the priority scheme. Operation 908 includes moving the second UE to a second frequency layer having a lower priority of the priority scheme. Operation 910 includes hosting a first packet session for the first UE using the first frequency layer.

Figure 10:
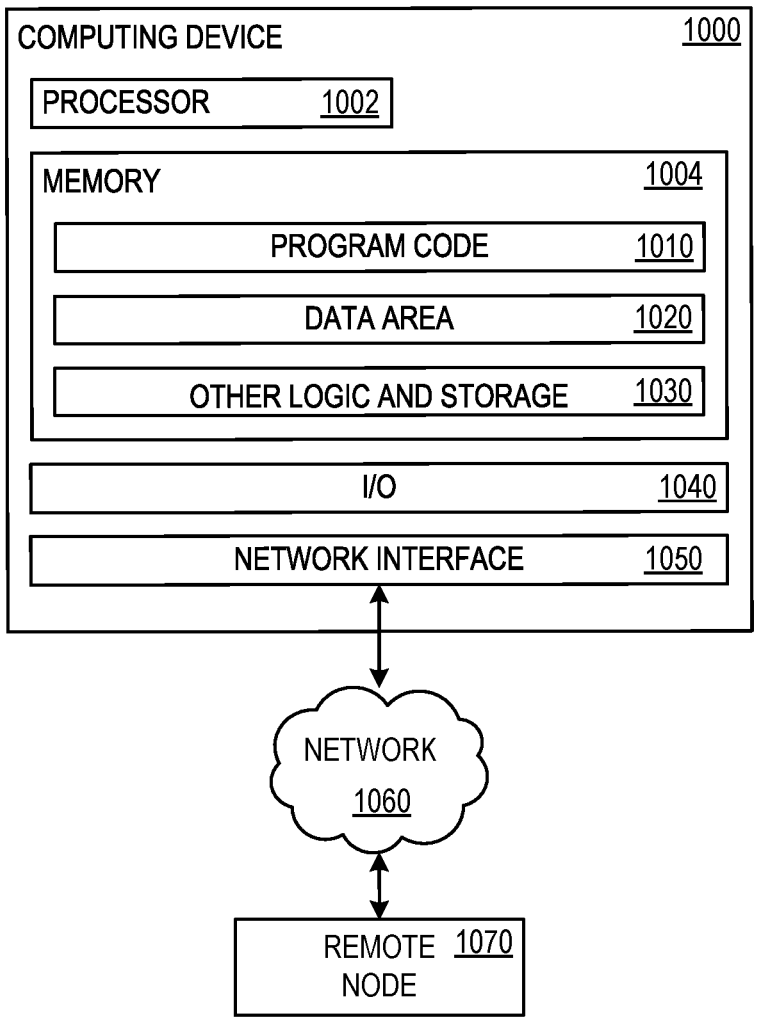
FIG. 10 illustrates a block diagram of a computing device suitable for implementing various aspects of the disclosure.

FIG. 10 illustrates a block diagram of computing device 1000 that may be used as any component described herein that may require computational or storage capacity. Computing device 1000 has at least a processor 1002 and a memory 1004 that holds program code 1010, data area 1020, and other logic and storage 1030. Memory 1004 is any device allowing information, such as computer executable instructions and/or other data, to be stored and retrieved. For example, memory 1004 may include one or more random access memory (RAM) modules, flash memory modules, hard disks, solid-state disks, persistent memory devices, and/or optical disks. Program code 1010 comprises computer executable instructions and computer executable components including instructions used to perform operations described herein. Data area 1020 holds data used to perform operations described herein. Memory 1004 also includes other logic and storage 1030 that performs or facilitates other functions disclosed herein or otherwise required of computing device 1000. An input/output (I/O) component 1040 facilitates receiving input from users and other devices and generating displays for users and outputs for other devices. A network interface 1050 permits communication over external network 1060 with a remote node 1070, which may represent another implementation of computing device 1000. For example, a remote node 1070 may represent another of the above-noted nodes within architecture 100.

Additional Examples

An example system comprises: a processor; and a computer-readable medium storing instructions that are operative upon execution by the processor to: determine a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity; receive a first session request from a first UE; and based on at least the first session request indicating non-GBR session, the network traffic load at the radio site exceeding a balancing threshold, and a device type of the first UE comprising a first device type: determine whether a second UE of a second device type is using a first frequency layer having a highest priority of the priority scheme; move the second UE to a second frequency layer having a lower priority of the priority scheme; and host a first packet session for the first UE using the first frequency layer.

An example method of wireless communication comprises: determining a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity; receiving a first session request from a first UE; and based on at least the first session request indicating a non-GBR session, the network traffic load at the radio site exceeding a balancing threshold, and a device type of the first UE comprising a first device type: determining that a second UE of a second device type is using a first frequency layer having a highest priority of the priority scheme; based on at least the second UE using the first frequency layer, moving the second UE to a second frequency layer having a lower priority of the priority scheme; and hosting a first packet session for the first UE using the first frequency layer.

One or more example computer storage devices has computer-executable instructions stored thereon, which, upon execution by a computer, cause the computer to perform operations comprising: determining a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity; receiving a first session request from a first UE; and based on at least the first session request indicating a non-GBR session, the network traffic load at the radio site exceeding a balancing threshold, and a device type of the first UE comprising a first device type: determining that a second UE of a second device type is using a first frequency layer having a highest priority of the priority scheme; moving the second UE to a second frequency layer having a lower priority of the priority scheme; and hosting a first packet session for the first UE using the first frequency layer, wherein the wireless network comprises a cellular network, the radio site comprises a cell site the first device type comprises eMBB or cellular telephone, and the second device type comprises FWA.

Alternatively, or in addition to the other examples described herein, examples include any combination of the following:

the wireless network comprises a cellular network;
the radio site comprises a cell site;
the first device type comprises eMBB or cellular telephone;
the second device type comprises FWA;
moving the second UE to the second frequency layer comprises initiating a handover of the second UE from the first frequency layer to the second frequency layer;
determining whether a signal quality of the second frequency layer, received by the second UE, supports the handover of the second UE to the second frequency layer;
moving the second UE to the second frequency layer comprises moving the second UE to the second frequency layer based on at least the signal quality of the second frequency layer supporting the handover;
determining that both the second UE and a third UE of the second device type are using the first frequency layer;
determining a historical usage of the second UE and a historical usage of the third UE;
comparing the historical usage of the second UE with the historical usage of the third UE;

moving the second UE to the second frequency layer comprises moving the second UE to the second frequency layer based on at least the historical usage of the second UE exceeding the historical usage of the third UE;
the priority scheme prioritizes the first frequency layer above the second frequency layer and the second frequency layer above a third frequency layer, based on at least the first frequency layer providing a higher traffic throughput capacity than the second frequency layer and the second frequency layer providing a higher traffic throughput capacity than the third frequency layer;
determining that a fourth UE of the second device type is using the second frequency layer;
determining a historical usage of the fourth UE;
comparing the historical usage of the second UE with the historical usage of the fourth UE;
moving the fourth UE to the third frequency layer based on at least the historical usage of the fourth UE exceeding the historical usage of the second UE and based on at least moving the second UE to the second frequency layer;
moving the fourth UE to the third frequency layer comprises initiating a handover of the fourth UE from the second frequency layer to the third frequency layer;
the handover of the fourth UE from the second frequency layer to the third frequency layer comprises an IFHO or an inter-RAT handover;
receiving a second session request from a fifth UE;
determining that a sixth UE of a third device type is using the first frequency layer, wherein the third device type comprises IoT or M2M;
based on at least the second session request indicating a non-GBR session, the network traffic load at the radio site exceeding the balancing threshold, and a device type of the fifth UE comprising the first device type, moving the sixth UE to the second frequency layer;
hosting a second packet session for the fifth UE using the first frequency layer;
the wireless network comprises a 5G cellular network;
the wireless network comprises a 4G cellular network;
each frequency layer comprises a cellular air interface frequency layer;
determining the network traffic load at the radio site comprises monitoring the network traffic load at the radio site;
the traffic throughput capacity is measured by air interface bandwidth;
the highest priority frequency layer has a higher traffic throughput capacity than the lower priority frequency layer;
the priority scheme has three tiers;
the current radio generation comprises 5G;
the prior radio generation comprises 4G;
the first and second session requests each comprises a 5QI;
a 5QI value of 5 through 9 indicates a non-GBR session;
the first session request comprises an IMEI of the first UE;
the second session request comprises an IMEI of the fifth UE;
the handover of the second UE from the first frequency layer to the second frequency layer comprises an IFHO or inter-RAT handover;
the handover of the fifth UE from the first frequency layer to the second frequency layer comprises an IFHO or an inter-RAT handover;

determining whether the signal quality of the second frequency layer supports the handover of the second UE to the second frequency layer is based on at least a measurement report of the second UE and a signal quality threshold;

moving the fifth UE to the second frequency layer comprises initiating a handover of the fifth UE from the first frequency layer to the second frequency layer;

receiving the IMEI from the first UE;

receiving the IMEI from the fifth UE;

determining the device type of the first UE;

determining the device type of the fifth UE;

determining whether the first session request indicates a non-GBR session;

determining whether the second session request indicates a non-GBR session;

determining whether the network traffic load at the radio site exceeds the balancing threshold;

comparing the historical usage of the second UE with the historical usage of the third UE comprises ranking historical usages of the second UE and the third UE;

determining the device type of the first UE using a TAC of the IMEI of the first UE; and determining the device type of the fifth UE using a TAC of the IMEI of the fifth UE.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

determining a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity;

receiving a first session request from a first UE; and based on at least the first session request indicating a non-guaranteed bitrate (non-GBR) session, the network traffic load at the radio site exceeding a balancing threshold, and a device type of the first UE comprising a first device type:

determining that a second UE of a second device type is using a first frequency layer having a highest priority of the priority scheme;

moving the second UE to a second frequency layer having a lower priority of the priority scheme; and hosting a first packet session for the first UE using the first frequency layer.

2. The method of claim 1, wherein:

the wireless network comprises a cellular network;

the radio site comprises a cell site;

the first device type comprises enhanced Mobile Broadband (eMBB) or cellular telephone; and the second device type comprises fixed wireless access (FW A).

3. The method of claim 1, wherein moving the second UE to the second frequency layer comprises:

initiating a handover of the second UE from the first frequency layer to the second frequency layer.

4. The method of claim 3, further comprising:

determining whether a signal quality of the second frequency layer, received by the second UE, supports the handover of the second UE to the second frequency layer, wherein moving the second UE to the second frequency layer comprises moving the second UE to the second frequency layer based on at least the signal quality of the second frequency layer supporting the handover.

5. The method of claim 1, further comprising:

determining that both the second UE and a third UE of the second device type are using the first frequency layer;

determining a historical usage of the second UE and a historical usage of the third UE; and comparing the historical usage of the second UE with the historical usage of the third UE, wherein moving the second UE to the second frequency layer comprises moving the second UE to the second frequency layer based on at least the historical usage of the second UE exceeding the historical usage of the third UE.

6. The method of claim 5, wherein the priority scheme prioritizes the first frequency layer above the second frequency layer and the second frequency layer above a third frequency layer, based on at least the first frequency layer providing a higher traffic throughput capacity than the second frequency layer and the second frequency layer providing a higher traffic throughput capacity than the third frequency layer; and wherein the method further comprises:

based on at least moving the second UE to the second frequency layer:

determining that a fourth UE of the second device type is using the second frequency layer;

determining a historical usage of the fourth UE;

comparing the historical usage of the second UE with the historical usage of the fourth UE; and moving the fourth UE to the third frequency layer based on at least the historical usage of the fourth UE exceeding the historical usage of the second UE.

7. The method of claim 1, further comprising:

receiving a second session request from a third UE; and based on at least the second session request indicating a non-GBR session, the network traffic load at the radio site exceeding the balancing threshold, and a device type of the third UE comprising the first device type:

determining that a fourth UE of a third device type is using the first frequency layer, wherein the third device type comprises internet of things (IOT) or machine-to-machine (M2M);

moving the fourth UE to the second frequency layer; and hosting a second packet session for the third UE using the first frequency layer.

8. A system comprising:

a processor; and a computer-readable medium storing instructions that are operative upon execution by the processor to:

determine a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity;

receive a first session request from a first UE; and based on at least the first session request indicating a non-guaranteed bitrate (non-GBR) session, the network traffic load at the radio site exceeding a balancing threshold, and a device type of the first UE comprising a first device type:

determine whether a second UE of a second device type is using a first frequency layer having a highest priority of the priority scheme;

move the second UE to a second frequency layer having a lower priority of the priority scheme; and host a first packet session for the first UE using the first frequency layer.

9. The system of claim 8, wherein:

the wireless network comprises a cellular network;

the radio site comprises a cell site;

the first device type comprises enhanced Mobile Broadband (eMBB) or cellular telephone; and the second device type comprises fixed wireless access (FWA).

10. The system of claim 8, wherein moving the second UE to the second frequency layer comprises:

initiating a handover of the second UE from the first frequency layer to the second frequency layer.

11. The system of claim 10, wherein the instructions are further operative to:

determine whether a signal quality of the second frequency layer, received by the second UE, supports the handover of the second UE to the second frequency layer, wherein moving the second UE to the second frequency layer comprises moving the second UE to the second frequency layer based on at least the signal quality of the second frequency layer supporting the handover.

12. The system of claim 8, wherein the instructions are further operative to:

determine that both the second UE and a third UE of the second device type are using the first frequency layer;

determine a historical usage of the second UE and a historical usage of the third UE; and compare the historical usage of the second UE with the historical usage of the third UE, wherein moving the second UE to the second frequency layer comprises moving the second UE to the second frequency layer based on at least the historical usage of the second UE exceeding the historical usage of the third UE.

13. The system of claim 12, wherein the priority scheme prioritizes the first frequency layer above the second frequency layer and the second frequency layer above a third frequency layer, based on at least the first frequency layer providing a higher traffic throughput capacity than the second frequency layer and the second frequency layer providing a higher traffic throughput capacity than the third frequency layer; and wherein the instructions are further operative to:

based on at least moving the second UE to the second frequency layer:

determine that a fourth UE of the second device type is using the second frequency layer;

determine a historical usage of the fourth UE;

compare the historical usage of the second UE with the historical usage of the fourth UE; and move the fourth UE to the third frequency layer based on at least the historical usage of the fourth UE exceeding the historical usage of the second UE.

14. The system of claim 8, wherein the instructions are further operative to:

receive a second session request from a third UE; and based on at least the second session request indicating a non-GBR session, the network traffic load at the radio site exceeding the balancing threshold, and a device type of the third UE comprising the first device type:

determine that a fourth UE of a third device type is using the first frequency layer, wherein the third device type comprises internet of things (IOT) or machine-to-machine (M2M);

move the fourth UE to the second frequency layer; and host a second packet session for the third UE using the first frequency layer.

15. One or more computer storage devices having computer-executable instructions stored thereon, which, upon execution by a computer, cause the computer to perform operations comprising:

determining a network traffic load at a radio site of a wireless network, the radio site providing multiple frequency layers, each frequency layer providing different traffic throughput capacity, wherein a priority scheme prioritizes the frequency layers of the radio site in descending order of traffic throughput capacity;

receiving a first session request from a first UE; and based on at least the first session request indicating a non-guaranteed bitrate (nonGBR) session, the network traffic load at the radio site exceeding a balancing threshold, and a device type of the first UE comprising a first device type:

determining that a second UE of a second device type is using a first frequency layer having a highest priority of the priority scheme;

moving the second UE to a second frequency layer having a lower priority of the priority scheme; and hosting a first packet session for the first UE using the first frequency layer, wherein the wireless network comprises a cellular network, the radio site comprises a cell site the first device type comprises enhanced Mobile Broadband (eMBB) or cellular telephone, and the second device type comprises fixed wireless access (FWA).

16. The one or more computer storage devices of claim 15, wherein moving the second UE to the second frequency layer comprises:

initiating a handover of the second UE from the first frequency layer to the second frequency layer.

17. The one or more computer storage devices of claim 16, wherein the operations further comprises:

determining whether a signal quality of the second frequency layer, received by the second UE, supports the handover of the second UE to the second frequency layer, wherein moving the second UE to the second frequency layer comprises moving the second UE to the second frequency layer based on at least the signal quality of the second frequency layer supporting the handover.

18. The one or more computer storage devices of claim 15, wherein the operations further comprises:

determining that both the second UE and a third UE of the second device type are using the first frequency layer;

determining a historical usage of the second UE and a historical usage of the third UE; and comparing the historical usage of the second UE with the historical usage of the third UE, wherein moving the second UE to the second frequency layer comprises moving the second UE to the second frequency layer based on at least the historical usage of the second UE exceeding the historical usage of the third UE.

19. The one or more computer storage devices of claim 18, wherein the priority scheme prioritizes the first frequency layer above the second frequency layer and the second frequency layer above a third frequency layer, based on at least the first frequency layer providing a higher traffic throughput capacity than the second frequency layer and the second frequency layer providing a higher traffic throughput capacity than the third frequency layer; and wherein the operations further comprise:

based on at least moving the second UE to the second frequency layer:

determining that a fourth UE of the second device type is using the second frequency layer;

determining a historical usage of the fourth UE;

comparing the historical usage of the second UE with the historical usage of the fourth UE; and moving the fourth UE to the third frequency layer based on at least the historical usage of the fourth UE exceeding the historical usage of the second UE.

20. The one or more computer storage devices of claim 15, wherein the operations further comprises:

receiving a second session request from a third UE; and based on at least the second session request indicating a non-GBR session, the network traffic load at the radio site exceeding the balancing threshold, and a device type of the third UE comprising the first device type:

determining that a fourth UE of a third device type is using the first frequency layer, wherein the third device type comprises internet of things (IOT) or machine-to-machine (M2M);

moving the fourth UE to the second frequency layer; and hosting a second packet session for the third UE using the first frequency layer.

* * * * *